United States Patent [19]

Wehner et al.

[11] 3,879,268

[45] Apr. 22, 1975

[54] METHOD FOR SEPARATING THIOPHENE FROM MIXTURES THEREOF WITH BENZENE

[75] Inventors: Klaus Wehner, Leuna; Werner Kisan, Halle-Neustadt; Gerald Kunz, Merseburg-West, all of Germany

[73] Assignee: Veb Leuna-Werke "Walter Ulbricht", Leuna, Germany

[22] Filed: Oct. 23, 1973

[21] Appl. No.: 408,892

[52] U.S. Cl. .................. 203/53; 203/51; 203/56; 203/58; 203/59; 203/60; 260/332.8; 260/674 R; 260/674 SE
[51] Int. Cl. ........ B01d 3/40; C07c 7/08; C07c 7/10
[58] Field of Search ............ 203/51, 56, 54, 55, 58, 203/60, 59; 260/332.8, 674 SE, 674 R

[56] References Cited
UNITED STATES PATENTS

| 2,818,453 | 12/1957 | Chenicek | 260/332.5 |
| 2,926,134 | 2/1960 | Simon | 203/58 |

FOREIGN PATENTS OR APPLICATIONS

| 254,134 | 10/1969 | U.S.S.R. | 260/332.8 |

*Primary Examiner*—Wilbur L. Bascomb, Jr.
*Attorney, Agent, or Firm*—Nolte and Nolte

[57] ABSTRACT

In the extraction, particularly the extractive distillation, of thiophene from a mixture thereof with benzene, a N-alkyl-ϵ-caprolactam, particularly in which the alkyl is of 1–4 carbon atoms, is used as the solvent which is selective for thiophene.

8 Claims, No Drawings

METHOD FOR SEPARATING THIOPHENE FROM MIXTURES THEREOF WITH BENZENE

This invention concerns a method for separating thiophene from mixtures thereof with benzene, particularly from technical fractions which contain thiophene and benzene as well as possibly other hydrocarbons, using selective solvents.

Benzene is an important starting product of the chemical industry. It is obtained today mostly from petroleum, but the production of benzene from coal has gained considerable importance. The crude benzene obtained in the technical production is always contaminated with sulfur compounds, particularly crude benzene fractions obtained by processing coal contain relatively high proportions of thiophene.

Because of the very high purity requirements for benzene used for further processing, it is necessary to remove the thiophene to a great extent from the crude benzene.

It is known to remove the thiophene impurities chemically from benzene. The most important technically used methods of this type are washing with concentrated sulfuric acid and catalytic hydrorefining.

The disadvantage of these methods is that losses in the benzene yield are unavoidable, and that the thiophene becomes unusuable since it is transformed into resinous waste products during the washing with sulfuric acid, while it is completely destroyed in catalytic hydrorefining.

Thiophene is a valuable starting product which is in great demand for chemical processing. Among the purposes for which it can be used are the production of dyes, plastics, special resins, vulcanization accelerators, antioxidants, perfume products, special solvents, growth stimulators, herbicides, defoliants and biologically active substances. Accordingly, the development of methods for separating thiophene from technical crude benzene without chemical changes is of great importance.

It has already been suggested to separate thiophene and benzene by azeotropic distillation with the use of methanol or dioxolane as azeotrope formers. The disadvantages of this procedure are the poor yields of the end product (dioxolane), difficult separation due to the proximity of the boiling point of the azeotrope of thiophene and benzene to that of the separating agent (methanol), as well as the technical difficulty in recovering the separating fluid from the azeotrope.

It is also known to free benzene of its thiophene content by liquid-liquid extraction. A suitable solvent is, for example, dimethyl sulfoxide in mixture with water. Due to the low thermal stability of dimethyl sulfoxide, there are considerable difficulties, however, in the obtaining of the extracts and in the regeneration of the solvent.

The same disadvantages also exist with the use of diethylene glycol as a liquid-liquid extractant.

It has also been suggested to separate benzene and thiophane by rectification. However, because of the small difference of the boiling points, the separation with sufficient purities and yields of both components is extremely difficult. It requires the use of a highly effective rectification apparatus, is very costly, and can therefore hardly be realized on a technical scale. Though distillation processes for the production of low-sulfur crude benzene fractions and thiophene-enriched fractions are of great importance in the coke chemicals industry, the production of highly concentrated thiophene fractions requires very high energy expenditures and results in great yield losses, while the production of pure thiophene from coking products by distillation is not possible because of the inseparable content of non-aromatic hydrocarbons.

Finally, it is known to achieve the separation of thiophene and benzene by extractive distillation, using selected solvents. This principle has advantages, due to its great effectiveness. The following solvents have been suggested so far: aliphatic glycols, such as ethylene glycol, di- and triethylene glycol; glycol ethers; alkanol amines, such as mono-, di- and triethanol amine; aliphatic diamines, such as ethylene diamine; aromatic amines, such as N,N-dimethyl-aniline, o- and m-phenylene diamine; dimethyl formamide; pyrrolidone-2; N-methyl-pyrrolidone-2; tricresyl phosphate; propylene carbonate; and 1,1-dioxytetrahydrothiophene (sulfolane).

A solvent for separating thiophene and benzene by extractive distillation must meet various requirements. The most important are:

high selectivity, as much as possible in wide concentration and temperature ranges;
high dissolving power at the operating temperature;
sufficiently great boiling point difference relative to the components to be separated;
high thermal stability;
high chemical stability;
low melting point;
safe to handle;
easy technical production;
low price.

All the solvents used so far have disadvantages as far as some of these requirements are concerned. Thus, for example, tricresyl phosphate and N,N-dimethylamine have a low selectivity. Pyrrolidone-2, sulfolane and particularly o- and m-phenylene diamine are not suitable for technical use because of their high melting points. Ethylene glycol and its derivatives, alkanol amine and ethylenediamine have relatively low dissolving powers. Propylene carbonate and derivatives of ethylene glycol, have disadvantages regarding thermal or chemical stability.

The object of the invention is to provide a method for separating thiophene from mixtures with benzene, particularly from technical fractions which contain thiophene and benzene as well as possibly other hydrocarbons, by using selective solvents and which is more economical than the known methods.

The problem is thus to find solvents for the separation of thiophene from mixtures with benzene and possibly other hydrocarbons which have a high dissolving power, high selectivity, very good thermal and chemical stability, a low melting point, and low viscosity values, are easy and safe to handle and of low toxicity, and are technically easy to produce, at a low price.

This problem is solved according to the invention in that a N-alkyl-ε-caprolactam or a mixture containing N-alkyl-ε-caprolactam is used as the selective solvent.

Preferably, a N-alkyl-ε-caprolactam is used the alkyl group of which contains 1 to 4 carbon atoms.

Of particular advantage is the use of N-methyl-ε-caprolactam. It is advisable that the N-alkyl-ε- caprolactam be used in mixture with added components, particularly with ethylene glycol and/or diethylene glycol and/or phenylene diamine.

Of particular advantage is the separation of thiophene by extractive distillation.

The solvents or solvent mixtures according to the invention can be used similarly to the prior art solvents for the selective separation of thiophene from mixtures with benzene. Since these solvents are also suitable for the selective separation of aromatic and non-aromatic hydrocarbons, the non-aromatic hydrocarbons contained in technical benzene-thiophene mixtures can likewise be separated at the same time in the benzene-thiophene separation.

By producing mixtures of the solvents according to the invention with added components, it is possible to vary the dissolving power and selectivity of the solvent system and to adapt it to different problems.

The N-alkyl-ε-caprolactams, particularly N-methyl-ε-caprolactam, exhibit a favorable selectivity behavior in the thiophene/benzene system (see Table 1). This is surprising insofar as the values of the dissolving power are very high, too. This shows, among other things, the superiority of the solvents according to the invention over dimethyl formamide and N-methyl-pyrrolidone-2.

The solvents according to the invention have, furthermore, a high thermal stability. Thus, for example, N-methyl-ε-caprolactam showed no signs of destruction on prolonged heating to boiling temperature at normal pressure.

Furthermore, the high chemical stability of the solvents according to the invention, particularly against hydrolytic influences in neutral aqueous media, is very noteworthy. This results in an extremely low corroding effect, which is highly advantageous for technical uses. Selective solvents used on a technical scale are employed in many cases in mixture with water to increase their selectivity. In addition to the reduced dissolving power, these solvent mixtures have a considerable corroding effect which can cause unpleasant disturbances and considerable operating costs. The corroding effects of aqueous mixtures of N-methyl-ε-caprolactam, dimethylformamide, N-methyl-pyrrolidone-2 and other solvents were, therefore, compared with each other by determining the linear corrosion rate to be expected per year by extrapolating the linear corrosion of carbon steel subjected to the action of the solvent mixtures for 28 days at 100°C. The following values, in which the proportions of water are by weight, were obtained:

| | corrosion in mm/year | Remarks |
|---|---|---|
| N-methyl-ε-caprolactam/ 25% water | 0.01 | slight punctiform corrosion |
| sulfolane/20% water | 0.21 | black top coat |
| dimethyl formamide/15% water | 0.38 | corrosion over large areas |
| N-methyl-pyrrolidone-2/25% water | 0.32 | corrosion over large areas |
| dimethyl sulfoxide/10% water | 0.77 | numerous pits and great areas of corrosion |

The great thermal stability, the great chemical stability, and related thereto, the extremely low corrosion effect represent substantial advantages of the solvents according to the invention, particularly N-methyl-ε-caprolactam.

The substances used according to the invention have relatively low viscosity values, and are easy to handle since their crystallization point is below 10°C and they exhibit a great tolerance for supercooling.

The toxicity of the solvents according to the invention is low.

Another advantage is that the solvents according to the invention can be synthesized from starting products which are technically available in large quantities.

The invention described above will be explained more fully in the following examples.

EXAMPLE 1

By determining limiting activity coefficients on the basis of gas chromatographic measurements, there was obtained in known manner comparative date concerning the selectivity and dissolving power of the solvents according to the invention in the benzene/thiophene system.

The results are compiled in Table 1. As a measure of the selectivity of the solvents, the quotient of the limiting activity coefficients at infinite dilution ($\gamma°$) is used, in accordance with the literature. The dissolving power for thiophene is expressed as the reciprocal value of the limiting activity coefficient at infinite dilution. For comparison, the corresponding values for some of the known solvents tested under the same conditions have been tabulated.

Table 1

| Solvent | Temperature (°C) | Dissolving Power ($1/\gamma°$Thiophene) | Selectivity ($\gamma°$Benzene/ $\gamma°$Thiophene) |
|---|---|---|---|
| N-Methyl-ε-caprolactam | 30 | 1.48 | 1.66 |
| | 60 | 1.59 | 1.63 |
| N-ethyl-ε-caprolactam | 30 | 1.88 | 1.55 |
| | 60 | 1.91 | 1.53 |
| N-butyl-ε-caprolactam | 30 | 1.95 | 1.48 |
| | 60 | 1.97 | 1.46 |
| Ethyleneglycol | 30 | 0.04 | 1.53 |
| | 60 | 0.04 | 1.50 |
| Diethyleneglycol | 30 | 0.19 | 1.50 |
| | 60 | 0.21 | 1.45 |
| Triethyleneglycol | 30 | 0.32 | 1.49 |
| | 60 | 0.34 | 1.44 |
| Sulfolane | 30 | 0.71 | 1.63 |
| | 60 | 0.78 | 1.60 |
| Monoethanolamine | 30 | 0.05 | 1.58 |
| | 60 | 0.07 | 1.55 |
| m-Phenylenediamine | 70 | 0.27 | 1.71 |
| Dimethylformamide | 30 | 0.88 | 1.50 |
| | 60 | 0.98 | 1.46 |
| N-Methylpyrrolidone-2 | 30 | 1.22 | 1.61 |
| | 60 | 1.26 | 1.58 |

The foregoing values show the particularly great dissolving power of the solvents according to the invention and at the same time their high selectivity, particularly in the case of N-methyl-ε-caprolactam.

EXAMPLE 2

Similarly to the compilation of data in Example 1, data was compiled concerning the behavior of N-methyl-ε-caprolactam in mixture with added components, namely, ethylene glycol, diethylene glycol and n-phenylene diamine. The results are listed in Table 2, in which the proportions in the solvent mixture are expressed by weight.

Table 2

| Solvent Mixture | Temperature (°C) | Dissolving power ($\gamma^\circ$Thiophene) | Selectivity ($\gamma^\circ$Benzene/$\gamma^\circ$Thiophene) |
| --- | --- | --- | --- |
| N-methyl-ε-caprolactam 20%/ ethyleneglycol 80% | 30 | 0.25 | 1.55 |
| N-methyl-ε-caprolactam 50%/ ethyleneglycol 50% | 30 | 0.33 | 1.58 |
| | 60 | 0.39 | 1.52 |
| N-methyl-ε-caprolactam 75%/ ethyleneglycol 25% | 30 | 0.95 | 1.63 |
| N-methyl-ε-caprolactam 80%/ ethyleneglycol 20% | 60 | 1.17 | 1.59 |
| N-methyl-ε-caprolactam 20%/ diethyleneglycol 80% | 30 | 0.36 | 1.53 |
| N-methyl-ε-caprolactam 50%/ diethyleneglycol 50% | 30 | 0.61 | 1.57 |
| | 60 | 0.75 | 1.53 |
| N-methyl-ε-caprolactam 75%/ diethyleneglycol 25% | 30 | 1.10 | 1.61 |
| | 60 | 1.18 | 1.58 |
| N-methyl-ε-caprolactam 50%/ m-phenylenediamine 50% | 30 | 0.45 | 1.67 |
| | 60 | 0.62 | 1.65 |
| N-methyl-ε-caprolactam 80%/ N-ethyl-ε-caprolactam 20% | 30 | 1.80 | 1.64 |
| | 60 | 1.85 | 1.61 |
| N-methyl-ε-caprolactam 50%/ N-ethyl-ε-caprolactam 50% | 30 | 1.67 | 1.61 |
| | 60 | 1.75 | 1.58 |

The values show that the dissolving power of ethylene glycol and diethylene glycol is considerably improved by the addition of N-methyl-ε-caprolactam. In the N-methyl-ε-caprolactam/m-phenylene diamine mixture the dissolving power of the mixture exceeds that of pure m-phenylene diamine. At the same time it is of advantage that the very unfavorable high crystallization point of m-phenylene diamine (62.8°C) is considerably reduced by the production of a mixture with N-methyl-ε-caprolactam, thereby providing substantially greater ease of handling.

The applicability of the solvents according to the invention in mixtures with added components is not limited to the exemplary such components and mixing ratios indicated above. In principle, the solvents according to the invention can be used in combination with all substances mentioned in the prior art as solvents for separating thiophene and benzene.

EXAMPLE 3

In a column packed with Raschig rings, the column being 2.5 m. in height and 35 mm. in inside diameter, a test mixture consisting of 35% by weight thiophene, 60% by weight benzene and 5% by weight cyclohexane was subjected to extractive distillation with N-methyl-ε-caprolactam. The test mixture was preheated and metered into the central part of the extractive distillation column. In the upper part of the column was added preheated N-methyl-ε-caprolactam in a 12.5 fold volume relative to the test mixture. With a reflux ratio of 3:1 to 3.5:1, by volume, a distillate was removed from the head of the column which contained practically quantitatively the amounts of benzene and cyclohexane contained in the original mixture, as well as 0.25% by weight thiophene. The solvent obtained in the sump of the column, which was laden with the extracted thiophene, was introduced into the center part of a second packed column and distilled. A head product was obtained which contained 98.7% thiophene. The solvent N-methyl-ε-caprolactam was recovered in the sump of the second column in practically pure form and it could be returned to the extractive distillation column for further use.

What is claimed is:

1. In the method of separating thiophene from a mixture thereof with benzene in which the mixture is subjected to extraction with a solvent selective for the thiophene and the benzene and thiophene are recovered, the improvement in which the solvent comprises a N-alkyl-ε-caprolactam.

2. In the method of claim 1, in the improvement in which the alkyl is of 1–4 carbon atoms.

3. In the method of claim 2, in the improvement in which the solvent comprises N-methyl-ε-caprolactam.

4. In the method of claim 1, in the improvement in which the solvent further comprises at least one of ethylene glycol, diethylene glycol and phenylene diamine.

5. The method of claim 1, in which the extraction is extractive distillation.

6. The method of claim 1, in which the extraction is liquid-liquid extraction.

7. In the method of claim 1, in the improvement in which the solvent is in mixture with water.

8. In the method of claim 3, in the improvement in which the solvent is in mixture with water.

* * * * *